No. 764,127. PATENTED JULY 5, 1904.
W. W. HOPKINS.
CAR BRAKE OPERATING MECHANISM.
APPLICATION FILED SEPT. 8, 1902.
NO MODEL. 2 SHEETS—SHEET 1.

Attest:
Edw. L. Dillon
M. Arnold

Inventor:
W. W. Hopkins
by J. D. Rippey
Att'y.

No. 764,127. PATENTED JULY 5, 1904.
W. W. HOPKINS.
CAR BRAKE OPERATING MECHANISM.
APPLICATION FILED SEPT. 8, 1902.
NO MODEL. 2 SHEETS—SHEET 2.

Attest:
Edw. L. Dillon
M. Arnold

Inventor:
W. W. Hopkins
by J. D. Rippey
Att'y.

No. 764,127. Patented July 5, 1904.

UNITED STATES PATENT OFFICE.

WILLIAM W. HOPKINS, OF ST. LOUIS, MISSOURI, ASSIGNOR OF ONE-HALF TO WILSON P. H. TURNER, OF NORMANDY, MISSOURI.

CAR-BRAKE-OPERATING MECHANISM.

SPECIFICATION forming part of Letters Patent No. 764,127, dated July 5, 1904.

Application filed September 8, 1902. Serial No. 122,490. (No model.)

*To all whom it may concern:*

Be it known that I, WILLIAM W. HOPKINS, a citizen of the United States, residing at St. Louis, Missouri, have invented a new and useful Car-Brake-Operating Mechanism, of which the following is a specification.

This invention relates to car-brake-operating mechanism; and it consists of the novel construction, combination, and arrangement of parts hereinafter shown, described, and claimed.

One object of this invention is to produce a power-brake in which the brake mechanism has an unbroken but loose connection with one of the car-axles, said connection being arranged in such manner that the brakes can be instantly applied with any desired force by the manipulation of the brake-lever mounted at the end of the car convenient to the motorman.

Another object is to provide a brake-operating mechanism consisting of a permanent and continuous connection between the brake mechanism and one of the car-axles with suitable devices for reducing or taking up said connection with any desired rapidity, so that the brakes can be set instantly or gradually to perform the double function of an emergency and service brake.

Figure 1:
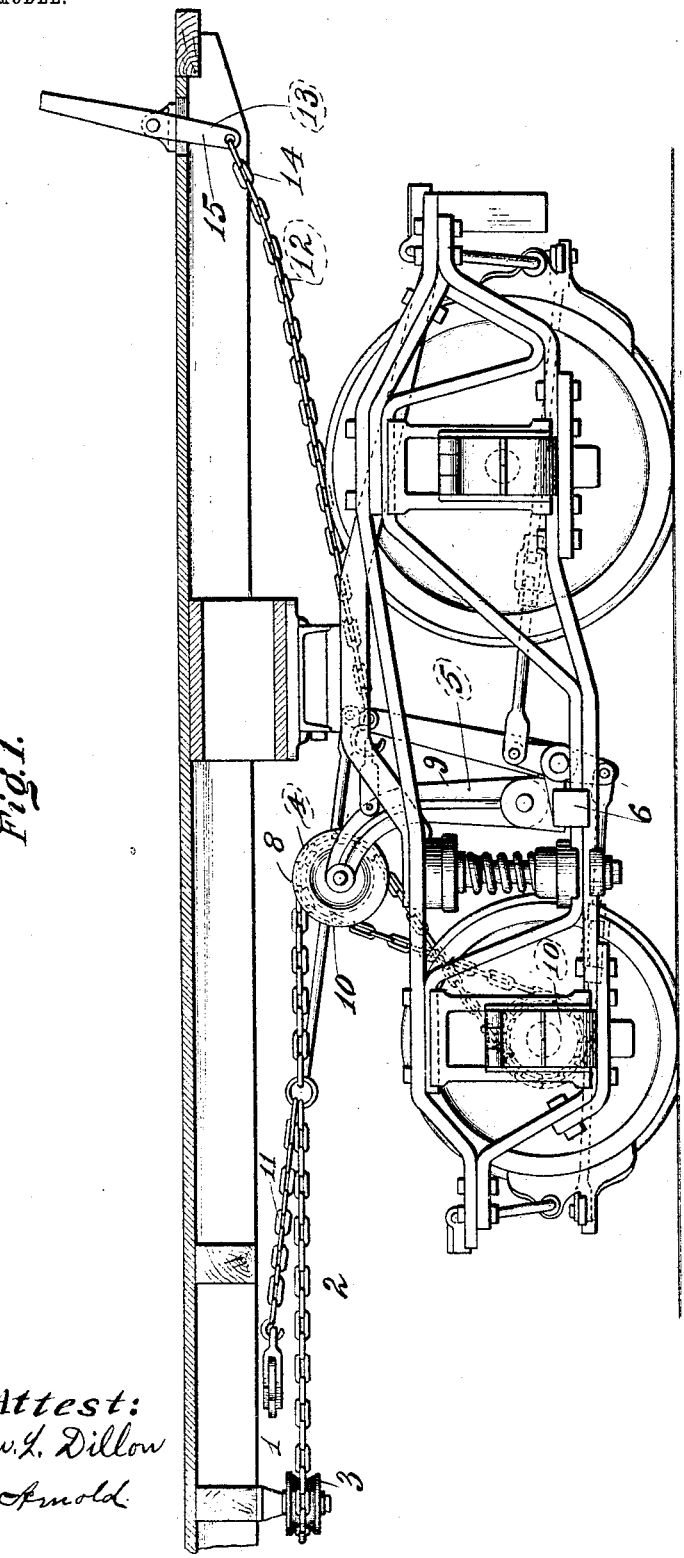
Figure 2:
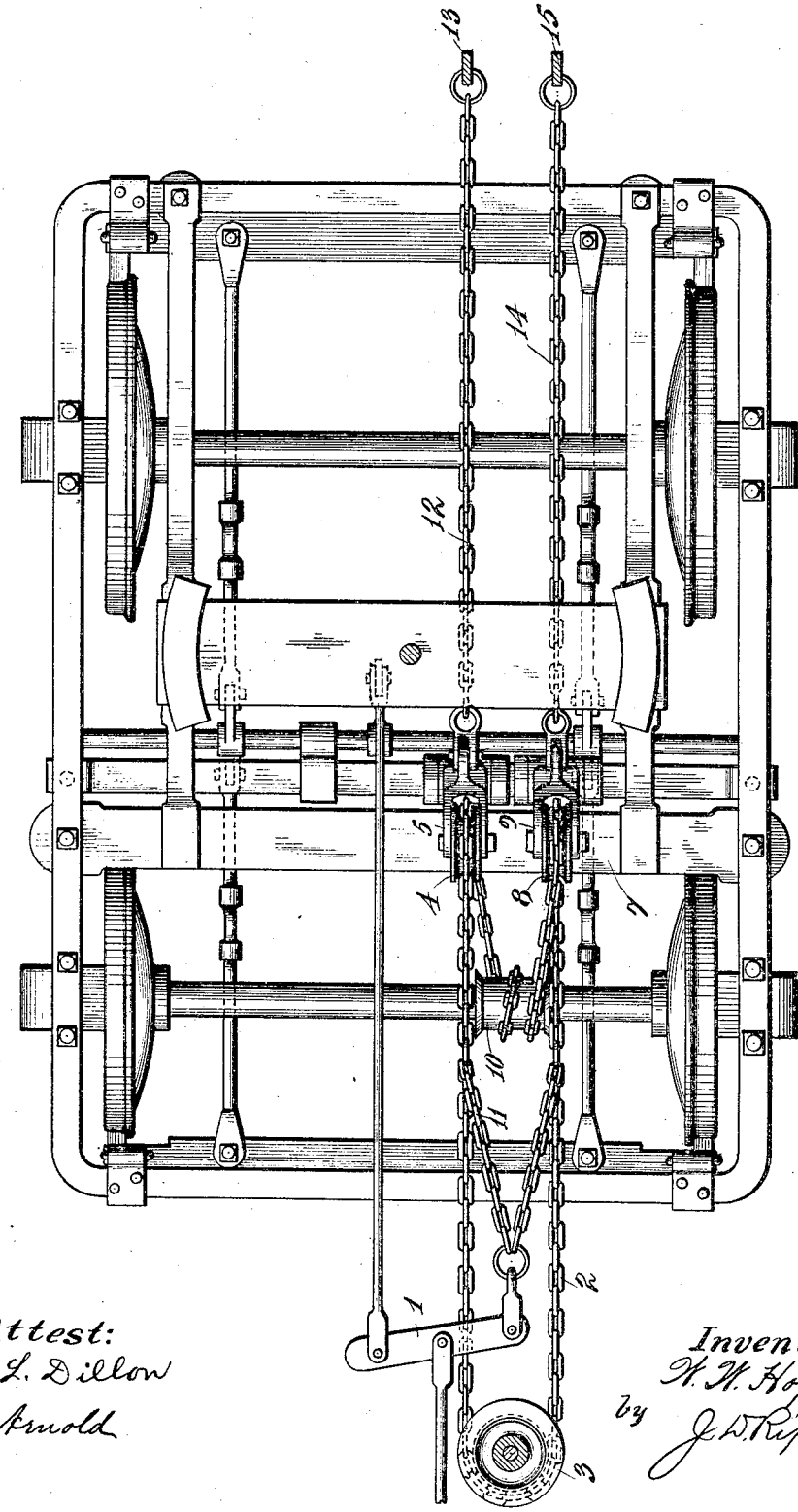

Figure 1 is a side elevation of a car-truck and the brake-operating mechanism mounted thereon. Fig. 2 is a plan view of the same.

The brake-shoes and other parts leading therefrom to the central brake-lever 1 may be of any preferred type; and my invention consists of suitable connections leading from the lever 1 to one of the car-axles and having normally loose connection therewith. Said connections comprise the endless chain 2, which is mounted around an idle pulley or wheel 3, supported under the car and extending therefrom to one of the car-axles and being wound thereon one or more times, as shown. Said chain, however, passes over a pulley or wheel 4, supported by the bifurcated arm 5 at some point between the pulley or wheel 3 and the car-axle. As shown, the arm 5 is pivotally supported by the crosspiece 6 of the truck in front of the axle around which the chain 2 passes. The arm 5 is held vertically by the truck member 7, against which it rests, but can be drawn forward, as hereinafter explained. From the pulley 5 the chain 2 passes around the axle and thence around over another wheel or pulley held by the arm 9, mounted and arranged in the same manner as the arm 5 and also capable of forward movement. A sleeve or spool 10 is fixed upon the axle to receive the windings of the chain 2 and also to protect the axle from wear. A connection 11 leads from each side of the chain 2 to one end of the central brake-lever 1, so that when the said chain is moved in either direction the brake-lever will be operated and the brakes set. Normally the arms 5 and 9 rest against the member 7, and when so positioned the chain 2 is sufficiently lax to permit the axle to turn without winding said chain thereon or moving it and applying the brakes. Such is the normal position of the parts; but the slack and laxity of the chain 2 can be taken up by moving either of the arms 5 or 9 forwardly. A chain 12 leads from the arm 5 to the front of the car and is connected there to the lower end of a lever 13, which extends through the floor of the car-platform and is convenient to the motorman. By operating the lever 13 to draw the chain 12 forward the arm 5 will be moved forwardly to tighten the chain 2, so that it will clasp the spool or sleeve 10, and thereby be drawn forward and will operate the lever 1 and set the brakes. This operation is obviously the necessary result. (See Fig. 2.) Thus the brakes are set when the car is moving forward, and they may also be set when the car travels backward by moving the arm 9 through the medium of a chain 14 and lever 15, similar to the chain 12 and lever 13. Either connection, however, will be effected to set the brakes while the car travels in either direction. Immediately after the levers are released the chain 2 becomes lax, and the axle is free to turn without resulting in the application of the brakes till one of the levers 13 or 14 is again operated.

The brakes can be applied instantly when necessary merely by applying greater power to the levers 13 or 15 when a quick stop is necessary than when a gradual stop is desired, as usual in service. The setting of the brakes follows instantly upon the application of power to either of the two levers, and yet the frictional connection existing between the chain 2 and the axle will be sufficiently yielding to avoid breakage or undue strain of any of the parts.

I claim—

1. The improved car-brake-operating mechanism, consisting of an endless chain passing loosely around one of the axles and connected with the brake-lever, one or more pivoted arms mounted for supports for said chain, and devices for moving said support or supports on the pivots and thereby binding the chain upon the axle, substantially as specified.

2. The improved car-brake-operating mechanism, consisting of a chain wound upon the axle and connected with the brake-lever, a pivoted arm to support said chain between its connecting-points, and a connection leading from the said support to the end of the car, and means for moving said connection and thereby the pivoted support to tighten the chain on the axle, substantially as specified.

3. A car-brake-operating device, consisting of a chain wound on the axle and connected with the brake-lever so that when moved the brake-lever will be operated and the brakes set, pivotally-mounted supports for said chain, connections leading from said supports to the ends of the car so that one may be moved from each end and the connected support thereby moved and the chain tightened if lax, and means for upholding said supports, substantially as specified.

In testimony whereof I have signed my name to this specification in the presence of two subscribing witnesses.

WILLIAM W. HOPKINS.

Witnesses:
SLOAN PITZER,
J. D. RIPPEY.